United States Patent
Duine et al.

(10) Patent No.: US 8,040,318 B2
(45) Date of Patent: Oct. 18, 2011

(54) ELECTROPHORETIC DISPLAY PANEL

(75) Inventors: Peter Alexander Duine, Eindhoven (NL); Dirk Jan Broer, Eindhoven (NL); Marcellinus Petrus Carolus Krijn, Eindhoven (NL); Volker Schoellmann, Duesseldorf (DE); Mark Thomas Johnson, Eindhoven (NL); Patrick John Baesjou, Eindhoven (NL); Eduard Matheus Johannes Niessen, Eindhoven (NL)

(73) Assignee: Koninklijke Philips Electronics N.V., Eindhoven (NL)

( * ) Notice: Subject to any disclaimer, the term of this patent is extended or adjusted under 35 U.S.C. 154(b) by 859 days.

(21) Appl. No.: 10/597,601

(22) PCT Filed: Jan. 27, 2005

(86) PCT No.: PCT/IB2005/050362
§ 371 (c)(1),
(2), (4) Date: Aug. 1, 2006

(87) PCT Pub. No.: WO2005/076062
PCT Pub. Date: Aug. 18, 2005

(65) Prior Publication Data
US 2008/0252592 A1 Oct. 16, 2008

(30) Foreign Application Priority Data
Feb. 6, 2004 (EP) .................... 04100441

(51) Int. Cl.
*G09G 3/34* (2006.01)
*G02B 26/00* (2006.01)
(52) U.S. Cl. ............. 345/107; 345/84; 359/296
(58) Field of Classification Search ........... 345/60, 345/84, 107; 359/228, 290, 296
See application file for complete search history.

(56) References Cited

U.S. PATENT DOCUMENTS

| 6,177,921 B1 | 1/2001 | Comiskey |
| 6,885,495 B2 | 4/2005 | Liang |
| 2002/0180688 A1 | 12/2002 | Drzaic |
| 2004/0252361 A1 * | 12/2004 | Machida et al. ........... 359/296 |

FOREIGN PATENT DOCUMENTS
WO  03019279 A1  3/2003

OTHER PUBLICATIONS

Kishi, E. et al "Development of In-Plane EPD" 2000 SID International Symposium Digest of Technical Papers, vol. 31, May 2000, pp. 24-27.

* cited by examiner

*Primary Examiner* — Srilakshmi K Kumar (57) ABSTRACT

The electrophoretic display panel(1) for displaying a picture and subsequently displaying a subsequent picture has a pixel (2) having an electrophoretic medium (5) having first and second charged particles (6,7) and an optical state depending on the positions of the particles (6,7) in the common region (30) of the pixel (2). Furthermore, transition control means are able to control a transition of the first and the second particles (6,7) being in substantially separated domains of the common region (30) for displaying the picture to substantially separated domains of the common region (30) for displaying the subsequent picture. For the display panel (1) to be able to have an attainable optical state for displaying the subsequent picture which is unequal to the optical state determined by the mixture of the first and second particles (6,7), even if the particles (6,7) have substantially equal electrophoretic mobilities, the transition control means are further able to control the first and the second particles (6,7) to be in substantially separated domains of the common region (30) during the transition.

19 Claims, 6 Drawing Sheets

ELECTROPHORETIC DISPLAY PANEL

The invention relates to an electrophoretic display panel for displaying a picture and subsequently displaying a subsequent picture comprising a pixel having an electrophoretic medium comprising first and second charged particles, the first charged particles having a first optical property, the second charged particles having a second optical property different from the first optical property, the first and the second charged particles being able to occupy positions in a common region of the pixel, an optical state depending on the positions of the particles in the common region, and transition control means being able to control a transition of at least a first number of the first particles and at least a second number of the second particles being in separate regions in the common region for displaying the picture to separate regions in the common region for displaying the subsequent picture.

The invention also relates to a display device comprising such an electrophoretic display panel.

The invention further relates to a method of driving such an electrophoretic display panel.

An embodiment of the electrophoretic display panel of the type mentioned in the opening paragraph is disclosed in U.S. Pat. No. 6,177,921.

Electrophoretic display panels in general are based on the motion of charged, usually colored particles under the influence of an electric field between electrodes. With these display panels, dark or colored characters can be imaged on a light or colored background, and vice versa. Electrophoretic display panels are therefore notably used in display devices taking over the function of paper, referred to as "paper white" applications, e.g. electronic newspapers and electronic diaries.

The disclosed electrophoretic display panel is a color display panel. The pixel has a transparent electrode at the side facing the viewer, an electrode at the side facing away from the viewer, multiple species of charged particles in a clear, dispersing fluid between the electrodes. Each species of particles has different optical properties and possesses different electrophoretic mobilities from the other species: e.g. red particles and blue particles, wherein the magnitude of the electric mobility of the red particles, on average, exceeds the electrophoretic ability of the blue particles, on average. Consider the pixel having a blue color for displaying the picture. The pixel having a blue color results from the blue particles being nearer to the electrode at the side facing the viewer than the red particles. The picture is updated, resulting in the pixel having e.g. a red color for displaying the subsequent picture, as follows. All the particles are attracted to the electrode at the side facing away from viewer by applying an electric field in the appropriate direction. The electric field should be applied to the pixel long enough to attract even the more slowly moving blue particles. Then the electric field is reversed just long enough to allow the red particles to migrate towards the electrode at the side facing the viewer. The blue particles will also move in the reversed electric field, but they will not move as fast as the red particles and thus will be obscured by the red particles.

The amount of time for which the applied electric field must be reversed depends on the relative electrophoretic mobilities of the particles and the strength of the applied electric field. If the picture is updated towards the pixel having a blue color for displaying the subsequent picture the updating is as follows. After the particles are attracted to the electrode at the side facing away from viewer the electric field is reversed just long enough to allow the red and blue particles to migrate towards the electrode at the side facing the viewer. The electric field is then reversed a second time and the red particles moving faster than the blue particles leave the blue particles exposed to the viewpoint. Therefore, the optical states attainable for the pixel for displaying the subsequent picture are red and blue. However, if the particles have substantially equal electrophoretic mobilities, only one optical state, being the optical state determined by the mixture of the first and second particles, is attainable for the pixel for displaying the subsequent picture.

It is an object of the invention to provide a display panel of the kind mentioned in the opening paragraph which is able to have an attainable optical state for displaying the subsequent picture which is unequal to the optical state determined by the mixture of the first and the second particles, even if the particles have substantially equal electrophoretic mobilities.

The object is thereby achieved that the transition control means are further able to control the first number of the first particles and the second number of the second particles to be in separate regions in the common region during the transition.

As a result, the first number of the first particles and the second number of the second particles are not only in unmixed states for displaying the picture, but the particles are held in unmixed states also during picture update and are therefore able to reach unmixed states for displaying the subsequent picture. Therefore, the process of mixing and subsequently unmixing the first number of the first particles and the second number of the second particles during picture update taking place in the disclosed electrophoretic display panel, is omitted during picture update in the display panel according to the invention. As a result, the picture update process in the display panel according to the invention is independent from differences in electrophoretic mobilities of the first and the second particles. Furthermore, as the first number of the first particles and the second number of the second particles are brought from separate regions in the common region for displaying the picture via separate regions in the common region to separate regions in the common region for displaying the subsequent picture, tile optical state for displaying the subsequent picture is unequal to the optical state determined by the mixture of the first and second particles.

In an embodiment the transition control means are able to control the transition of the first and the second particles being in substantially separate regions in the common region for displaying the picture to substantially separate regions in the common region for displaying the subsequent picture, and the transition control means are further able to control the first and the second particles to be in substantially separate regions in the common region during the transition.

As on an atomic/molecular scale two particles always have non-equal positions, it is clear that substantially separate regions only have a meaning from a macroscopic point of view. First and second particles are in substantially separate regions if e.g. the envelope macroscopically surrounding the first particles is substantially non-coinciding with the envelope macroscopically surrounding the second particles.

In an embodiment the common region comprises at least three substantially separate regions, at least one of which is unoccupied, the transition control means comprise:

electrodes for receiving potentials, each one of the electrodes being associated with a substantially separate region, and drive means being able to control the potentials to control the transition of the first and the second particles being in separate ones of the substantially separate regions for displaying the picture to separate ones of the substantially separate regions for displaying the subsequent picture, and the transition comprises a sub-transition wherein a member of a list having as members a collection of the first particles and a collection of the second particles is brought from the member's substantially separate region to one of the substantially empty separate regions. Furthermore, the transition may also comprise a number of such sub-transitions. Then the movement and position of the particles depends on the electric field distribution. As the electric field distribution depends on the potential differences and the geometry of the electrodes, the combination of the geometry of the electrodes and the potential differences are chosen such that the particles can be brought from substantially separate regions for displaying the picture via substantially separate regions during picture update towards substantially separate regions for displaying the subsequent picture. Furthermore, the substantially separate regions as well as the sub-transitions are well-defined.

In a variation on the embodiment a first one of the substantially separate regions provides a first reservoir for the first particles substantially non-contributing to the optical state of the pixel, and a second one of the substantially separate regions provides a second reservoir for the second particles substantially non-contributing to the optical state of the pixel, a third one of the substantially separate regions substantially contributes to the optical state of the pixel, and the transition comprises:

a first sub-transition wherein the member being in the third one of the substantially separate regions for displaying the picture is brought to the member's reservoir, and subsequently a second sub-transition wherein one of the members is brought from the member's reservoir to the third one of the substantially separate regions for displaying the subsequent picture.

Then the geometry is relatively simple and the driving scheme can relatively simply be implemented. Furthermore, the pixel has at least three attainable optical states, being the optical states determined by 1) the first particles being in the third one of the substantially separate regions,
2) the second particles being in the third one of the substantially separate regions, and
3) none of the first and the second particles being in the third one of the substantially separate regions.

Furthermore, optical states intermediate between optical states 1) and 3) are also attainable. This can e.g. be realized if in the transition only a limited number of the first particles is brought to the third one of the substantially separate regions. Furthermore, optical states intermediate between optical states 2) and 3) are also attainable. This can e.g. be realized if in the transition only a limited number of the second particles is brought to the third one of the substantially separate regions.

In another variation on the embodiment a first one of the substantially separate regions provides a first reservoir for the first particles substantially noncontributing to the optical state of the pixel, and a second one of the substantially separate regions provides a second reservoir for the second particles substantially non-contributing to the optical state of the pixel, a third one and a fourth one of the substantially separate regions each substantially contribute to the optical state of the pixel, and the transition comprises:

a first sub-transition wherein the members being in the third one and the fourth one of the substantially separate regions for displaying the picture are brought to their respective reservoirs, and subsequently a second sub-transition wherein the members are brought from their respective reservoirs to the third one and the fourth one of the substantially separate regions for displaying the subsequent picture.

Then the geometry is relatively simple and the driving scheme can relatively simply be implemented. Furthermore, the pixel has at least nine attainable optical states, being the optical states determined by 1) the first particles being in the third and the fourth one of the substantially separate regions,
2) the first particles being in the third one of the substantially separate regions and none of the first and the second particles being in the fourth one of the substantially separate regions,
3) the first particles being in the fourth one of the substantially separate regions and none of the first and the second particles being in the third one of the substantially separate regions,
4) the second particles being in the third one and the fourth one of the substantially separate regions,
5) the second particles being in the third one of the substantially separate regions and none of the first and the second particles being in the fourth one of the substantially separate regions,
6) the second particles being in the fourth one of the substantially separate regions and none of the first and tile second particles being in the third one of the substantially separate regions,
7) the first particles being in the third one of the substantially separate regions and the second particles being in the fourth one of the substantially separate regions,
8) the second particles being in the third one of the substantially separate regions and the first particles being in the fourth one of the substantially separate regions, and
9) none of the first and the second particles being in the third one and the fourth one of the substantially separate regions Similarly to the previous embodiment, intermediate optical states are also attainable.

In another variation on the embodiment a first one of the substantially separate regions provides a first reservoir for the first particles substantially non-contributing to the optical state of the pixel, and a second one of the substantially separate regions provides a second reservoir for the second particles substantially non-contributing to the optical state of the pixel, a third one and a fourth one of the substantially separate regions each substantially contribute to the optical state of the pixel, and the transition comprises:
- a first sub-transition wherein the members being in the third one and the fourth one of the substantially separate regions for displaying the picture that will be absent in the third one and the fourth one of the substantially separate regions for displaying the subsequent picture are brought to their respective reservoirs, and subsequently
- a second sub-transition wherein the members which are absent in the third one and the fourth one of the substantially separate regions for displaying the picture that have to be present in the third one and the fourth one of the substantially separate regions for displaying the subsequent picture are brought from their respective reservoirs to the third one and/or the fourth one of the substantially separate regions for displaying the subsequent picture.

In this way unnecessary movement of particles is reduced, whereas, furthermore, the optical state during picture update may be optically closer to the optical state of the subsequent picture than in the previous variation on the embodiment thereby providing a smoother picture update.

In yet another variation on the embodiment
- the pixel has a viewing surface for being viewed by a viewer,
- the electrodes have substantially flat surfaces facing the particles, and
- the surfaces are substantially parallel to the viewing surface.

Then the geometry of the electrodes and surfaces of the electrodes can relatively simply be manufactured. If, furthermore, the surfaces of the electrodes are present in a substantially flat plane, the manufacturing process of the electrodes is further simplified.

In still another variation on the embodiment
- the pixel has a viewing surface for being viewed by a viewer,
- the electrodes have substantially flat surfaces facing the particles,
- the surfaces of the electrodes being associated with substantially separate regions that are substantially contributing to the optical state of the pixel are substantially parallel to the viewing surface, and
- the surfaces of the electrodes being associated with substantially separate regions that are substantially non-contributing to the optical state of the pixel are substantially perpendicular to the viewing surface.

This results in a more compact layout of the pixel.

In still another variation on the embodiment
- a first one of the substantially separate regions provides a first reservoir for the first particles,
- a second one of the substantially separate regions provides a second reservoir for the second particles, and
- the display panel further comprises first decoupling means to reduce the influence of the potential of the electrode associated with the first reservoir on the position of the second particles.

If, furthermore, the display panel further comprises second decoupling means to reduce the influence of the potential of the electrode associated with the second reservoir on the position of the first particles. Then the positions of the first and second particles can relatively accurate be determined by the potentials.

In a variation on the embodiment the first and the second decoupling means are realised by the electrophoretic medium comprising a hyseresis effect. The electrophoretic medium comprises a hysteresis effect if the following holds: if the electrophoretic medium is brought from a first state into a second state by applying a potential difference, reversal of the applied potential difference does not bring the medium back from the second state into the first state. Then the movement and position of the particles also depends on the history of the potential differences. This hysteresis effect can be used as decoupling means.

In another variation on the embodiment the first and the second decoupling means comprise a first and a second gate electrode for receiving a first and a second gate potential, the first and the second gate electrode being present between the electrodes associated with the first and the second reservoir. It is advantageous if, furthermore, the first gate electrode is present between the electrode associated with the first reservoir and the electrode associated with a third one of the substantially separate regions and the second gate electrode is present between the electrode associated with the second reservoir and the electrode associated with the third one of the substantially separate regions. It is advantageous if, furthermore, in operation, the potentials of the electrodes associated with the first and the second reservoir and the potential of the electrode associated with the third one of the substantially separate regions are substantially constant in time. Then the electrodes associated with the first and the second reservoir and the electrode associated with the third one of the substantially separate regions are passive components during image update, whereas the transition is controlled by the first and the second gate potential. As a result, the design of the display panel is less complicated.

In yet another variation on the embodiment the first and the second decoupling means comprise a first particles repulsive layer present between the electrode associated with the first reservoir and the electrode associated with a third one of the substantially separate regions, and a second particles repulsive layer present between the electrode associated with the second reservoir and the electrode associated with the third one of the substantially separate regions.

In still another variation on the embodiment the first and the second decoupling means comprise a first membrane through which a passage of the first particles is determined by a first threshold, the first membrane being present between the electrode associated with the first reservoir and the electrode associated with a third one of the substantially separate regions, and a second membrane through which a passage of the second particles is determined by a second threshold, the second membrane being present between the electrode associated with the second reservoir and the electrode associated with the third one of the substantially separate regions.

In another embodiment, the display panel is an active matrix display panel.

Another aspect of the invention provides a display device comprising an electophoretic display panel as claimed in claim 18.

Yet another aspect of the invention provides a method of driving an electrophoretic display panel as claimed in claim 19.

In an embodiment the method comprises controlling the transition of the first and the second particles from substantially separate regions in the common region for displaying the picture via substantially separate regions in the common region to substantially separate regions in the common region for displaying the subsequent picture.

These and other aspects of the display panel of the invention will be further elucidated and described with reference to the drawings, in which.

In all the Figures corresponding parts are referenced to by the same reference numerals.

FIGS. 1, 2, 3 and 4 show an example of the display panel 1 having a first substrate 8, a second transparent opposed substrate 9 and a plurality of pixels 2. Preferably, the pixels 2 are arranged along substantially straight lines in a two-dimensional structure. Other arrangements of the pixels 2 are alternatively possible, e.g. a honeycomb arrangement. In an active matrix embodiment, the pixels 2 may further comprise switching electronics, for example, thin film transistors (TFTs), diodes, MIM devices or the like.

An electrophoretic medium 5, having first charged particles 6 and second charged particles 7 in a fluid, is present between the substrates 8,9. Electrophoretic media 5 are known per se from e.g. U.S. 2002/0180688 and can e.g. be obtained from E Ink Corporation. The first charged particles 6 have a first optical property. The second charged particles 7 have a second optical property different from the first optical property. The first particles 6 may have any color, whereas the second particles 7 may have any color different from the color of the first particles 6. The color of the first particles 6 is for instance red, green, blue, yellow, cyan, magenta, white or black. Preferably, the first and second particles 6,7 have different basic colors, e.g. the first particles 6 being red and second particles 7 being green. The first and the second particles 6,7 are able to occupy positions in a common region 30 of the pixel 2. The optical state of a pixel 2 depends on the positions of the particles 6,7 in the common region 30. The transition control means are able to control a transition of the first and the second particles 6,7 being in substantially separate regions in the common region 30 for displaying the picture to substantially separate regions in the common region 30 for displaying the subsequent picture. The transition control means are further able to control the first and the second particles 6,7 to be in substantially separate regions in the common region 30 during the transition.

Figure 1:
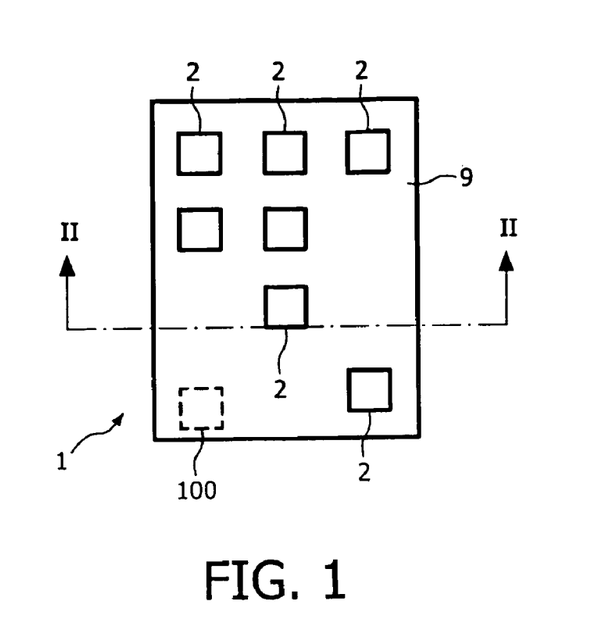
FIG. 1 shows diagrammatically a front view of an embodiment of the display panel.
Figure 2:
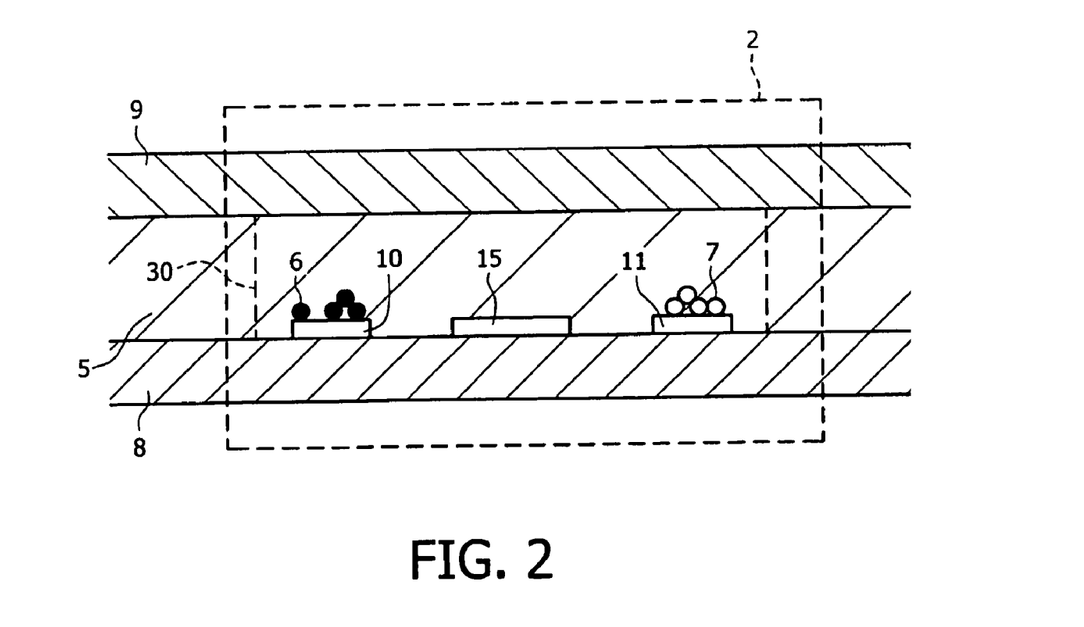
FIG. 2 shows diagrammatically a cross-sectional view along II-II in FIG. 1.
Figure 3:
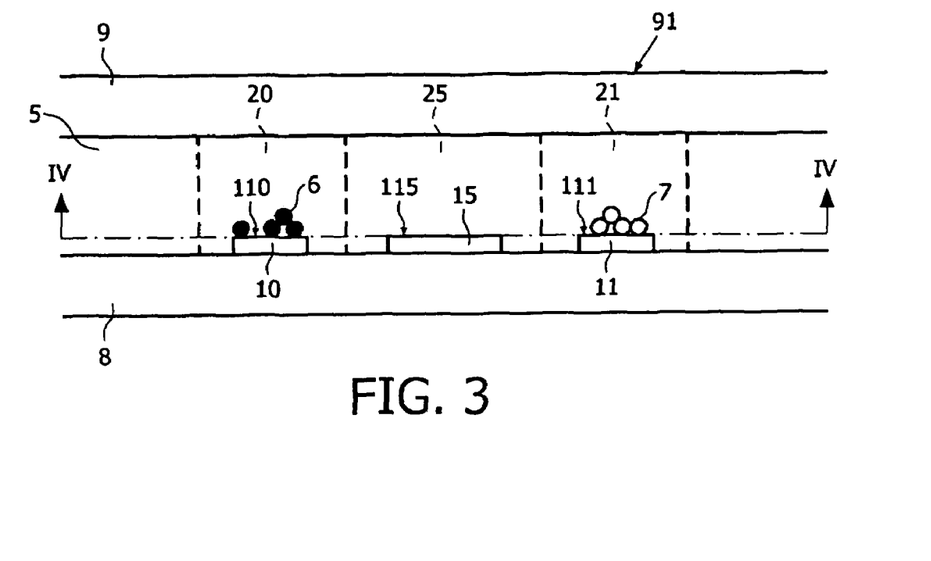
FIG. 3 shows diagrammatically some details of FIG. 2.

The configuration of FIG. 2 is shown in some detail in FIG. 3. The pixel 2 has a viewing surface 91 for being viewed by a viewer. The common region 30 has three substantially separate regions 20,21,25. The transition control means has electrodes 10,11,15 for receiving potentials. Each one of the electrodes 10,11,15 is associated with a respective substantially separate region 20,21,25. In this case, each one of the electrodes 10,11,15 has a substantially flat surface 110,111, 115 facing the particles 6,7 and the viewing surface 91. Furthermore, the surfaces 110,11,115 of the electrodes 10,11,15 are present in a substantially flat plane. The transition control means has drive means 100 able to control the potentials to control the transition of the first and the second particles 6,7 being in separate ones of the substantially separate regions 20,21,25 for displaying the picture to separate ones of the substantially separate regions 20,21,25 for displaying the subsequent picture. Furthermore, the transition comprises a number of sub-transitions wherein in each sub-transition a member of the first and the second particles 6,7 is brought from the member's substantially separate region to one of the substantially empty separate regions.

Figure 4:
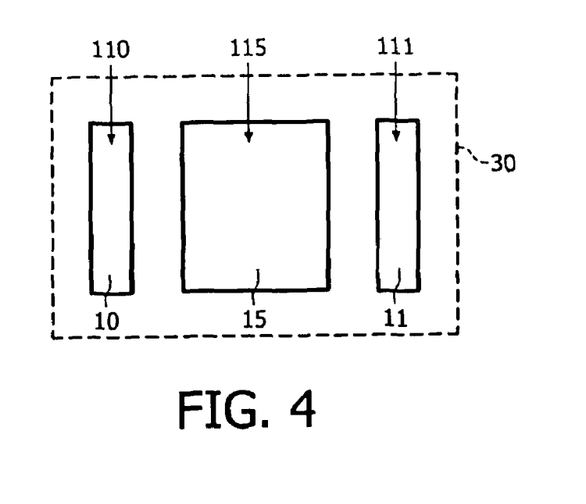
FIG. 4 shows diagrammatically cross-sectional view along IV-IV in FIG. 3, the cross-sectional view representing a layout of the electrodes of a pixel.

In FIG. 4 a layout of the electrodes 10,11,15 is shown. In this example, the substantially separate regions 20,21,25 contribute respectively 25%, 25% and 50% to the optical state of the pixel 2. This may e.g. be achieved by the electrodes 10,11, 15 having surface areas at ratios of 1:2:1 as seen by an observer. Consider the fluid to be transparent, the first and second particles 6,7 to be negatively charged and the first particles 6 to have a red color, denoted by R, and the second particles 7 to have a green color, denoted by G. Furthermore, the electrodes 10,11,15 are blue, denoted by B. Consider the pixel layout of FIG. 4. As an example, for displaying the picture, the red particles 6 are in substantially separate region 20 near the surface 110 of electrode 10, and the green particles 7 are in substantially separate region 21 near the surface 111 of electrode 11, whereas substantially no particles 6,7 are in substantially separate region 25. The electrodes 10,11,15 have respective potentials of e.g. 10 Volts, 10 Volts and 0 Volts. The optical state of the pixel 2 for displaying the picture is denoted by ¼ R ¼ G ½ B, i.e. the optical state of the pixel 2 is an average of 25% red, 25% green and 50% blue. Consider the optical state of the pixel 2 for displaying the subsequent picture to be ¼ R ½ G ¼ B. To obtain this optical state, the electrodes 10,11,15 receive respective potentials of e.g. 10 Volts, 0 Volts, and 10 Volts from the drive means 100. The combination of electrode geometries and potentials is chosen such that near the surface 110 of electrode 10 substantially no electric field is present and between electrodes 11 and 15 an electric field is present in the appropriate direction. As a result, the red particles 6 remain present near the surface 110 of electrode 10 in substantially separate region 20 and the green particles 7 are brought from their position near the surface 111 of electrode 11 to a position near the surface 115 of electrode 15 in substantially separate region 25. Then the optical state of the pixel 2 for displaying the subsequent picture is ¼ R ½ G ¼ B.

Note that the pixel 2 has at least three achievable optical states: ¼ R ¼ G ½ B, ¼ R ½ G ¼ B and ½ R ¼ G ¼ B. If the optical state of the pixel 2 for displaying the picture is ¼ R ½ G ¼ B and the optical state of the pixel 2 for displaying the subsequent picture is ½ R ¼ G ¼ B then the transition is somewhat more complicated. For displaying the picture, the electrodes 10,11,15 have respective voltages 10 Volts, 0 Volts, 10 Volts. For achieving the first sub-transition, the electrodes 10,11,15 receive respective potentials 10 Volts, 10 Volts and 0 Volts from the drive means 100. As a result, the red particles 6 remain present near the surface 110 of electrode 10 in substantially separate region 20 and the green particles 7 are brought from their position near the surface 115 of electrode 15 to a position near the surface 111 of electrode 11 in substantially separate region 21. Subsequently, for achieving the second sub-transition, the electrodes 10,11,15 receive respective potentials 0 Volts, 10 Volts and 10 Volts from the drive means 100. As a consequence of these potentials, the green particles 7 remain present near the surface 111 of electrode 11 in substantially separate region 21 and the red particles 6 are brought from their position near the surface 110 of electrode 10 to a position near the surface 115 of electrode 15 in substantially separate region 25. Then the optical state of the pixel 2 for displaying the subsequent picture is ½ R ¼ G ¼ B.

Figure 5:
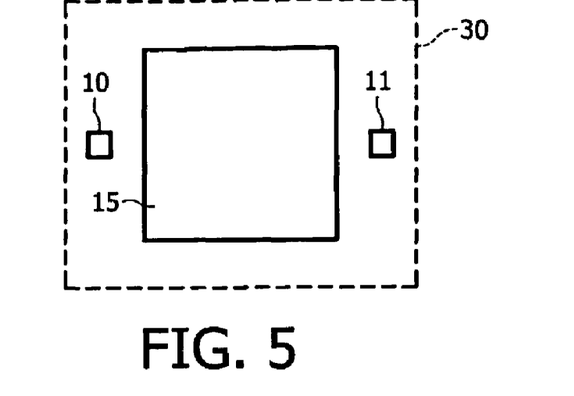
FIGS. 5-11 show diagrammatically other layouts of electrodes of a pixel.

In FIG. 5 a layout of the electrodes 10,11,15 in another embodiment of the pixel 2 is shown. In this example, substantially separate region 20 provides a first reservoir for the red particles 6 and is substantially non-contributing to the optical state of the pixel 2 and substantially separate-region 21 provides a second reservoir for the green particles 7 and is substantially non-contributing to the optical state of the pixel 2. Substantially separate region 25 substantially determines the optical state of the pixel 2. This is achieved by the surface area of electrode 15 as seen by an observer being at least one order of magnitude larger than the surface areas of electrodes 10 and 11 as seen by an observer. Another way of achieving this is by shielding electrodes 10 and 11 from the observer by e.g. having a light absorbing layer between the electrodes 10 and 11 the observer. The driving scheme for changing the optical state is similar to the driving scheme of the pixel 2 of FIG. 4. Note that the pixel 2 has at least three achievable optical states related to the three basic colors: R (red particles 6 near the surface 115 of electrode 15), G (green particles 7 near the surface 115 of electrode 15) and B (blue color of that surface 115 of electrode 15, as no red and green particles 6,7 are near the surface 115 of electrode 15). Furthermore, optical states intermediate between the three basis colors are also attainable. This can e.g. be realized if in the transition only a limited number of the red particles 6 or the green particles 7 are brought near the surface 115 of electrode 15.

Figure 6:
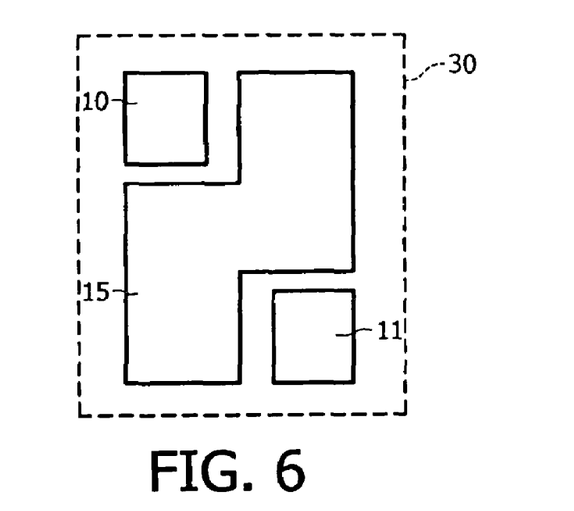
Figure 7:
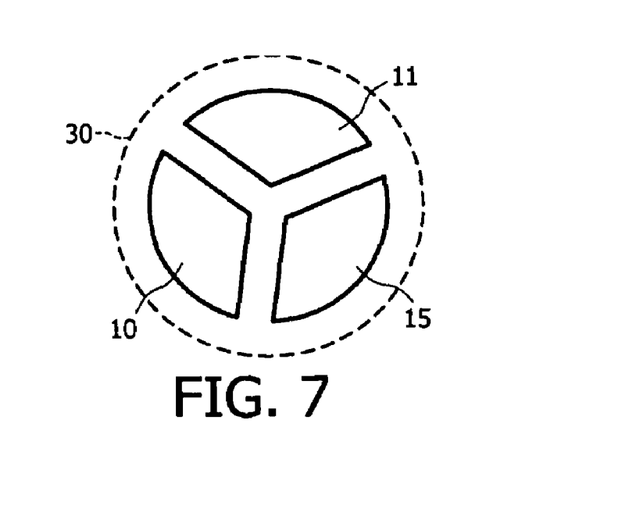

Many other layouts of the electrodes 10,11,15 of the pixel 2 are possible, see e.g. the layouts shown in FIGS. 6 and 7.

Figure 8:
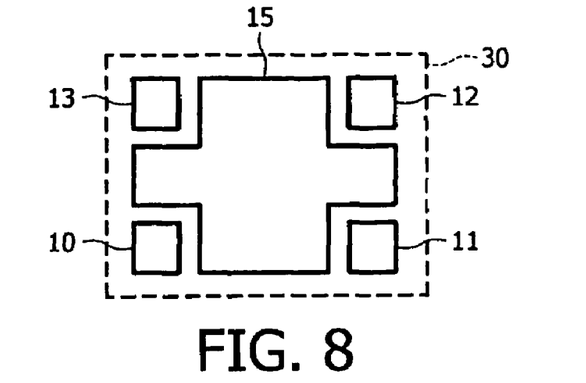

In another embodiment, the first, second, third and fourth particles 6,7,40,41 are negatively charged and the particles 6,7,40,41 are red, green, blue and white, denoted by W, respectively. The common region 30 has five substantially separate regions 20,21,22,23,25. The transition control means has electrodes 10,11,12,13,15 for receiving potentials. Each one of the electrodes 10,11,12,13,15 is associated with a respective substantially separate region 20,21,22,23,25. In this case, each one of the electrodes 10,11,12,13,15 has a flat surface 110,111,112,115 facing the second substrate 9. The layout of the pixel 2 is shown in FIG. 8. The substantially separate regions 20,21,22,23 provide a first reservoir for the red particles 6, a second reservoir for the green particles 7, a third reservoir for the blue particles 40, and a fourth reservoir for the white particles 41, respectively, and are substantially non-contributing to the optical state of the pixel 2. The substantially separate region 25 substantially determines the optical state or the pixel 2. Electrode 15 is black.

The pixel has five achievable optical states: Black, R, G, B and W. As a result, the display is able to provide an accurate color picture. As an example, for displaying the picture, the red particles 6 are in substantially separate region 20 near the surface 110 of electrode 10, the green particles 7 are in substantially separate region 21 near the surface 111 of electrode 11, the blue particles 40 are in substantially separate region 22 near the surface 112 of electrode 12, the white particles 41 are in substantially separate region 25 near the surface 115 of electrode 15, whereas substantially no particles 6,7,40,41 are in substantially separate region 23 near the surface 113 of electrode 13. The electrodes 10,11,12,13,15 have respective potentials 10 Volts, 10 Volts, 10 Volts, 0 Volts and 10 Volts. The optical state of the pixel 2 for displaying the picture is W. Consider the optical state of the pixel 2 for displaying the subsequent picture to be R. For achieving the first sub-transition, the electrodes 10,11,12,13,15 receive respective potentials 0 Volts, 0 Volts, 0 Volts, 10 Volts and 0 Volts from the drive means 100. As a result, the red, green and blue particles 6,7,40 remain present near the surface of their respective electrodes 10,11,12, whereas the white particles 41 are brought from their position near the surface 115 of electrode 15 to a position near the surface 114 of electrode 14 in substantially separate region 24. Subsequently, for achieving the second sub-transition, the electrodes 10,11,12,13,15 receive respective potentials 0 Volts, 10 Volts, 10 Volts, 10 Volts and 10 Volts from the drive means 100. As a consequence of these potentials, the green, blue and white particles 7,40,41 remain present near the surface of their respective electrodes 11,12,13 and the red particles 6 are brought from their position near the surface 110 of electrode 10 to a position near the surface 115 of electrode 15 in substantially separate region 25. Then the optical state of the pixel 2 for displaying the subsequent picture is R.

Figure 9:
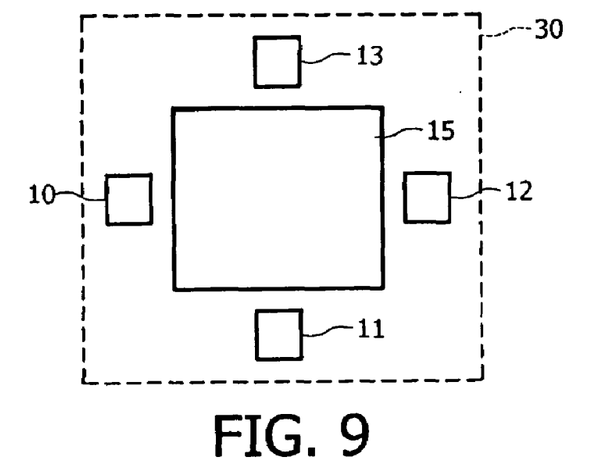
Figure 10:
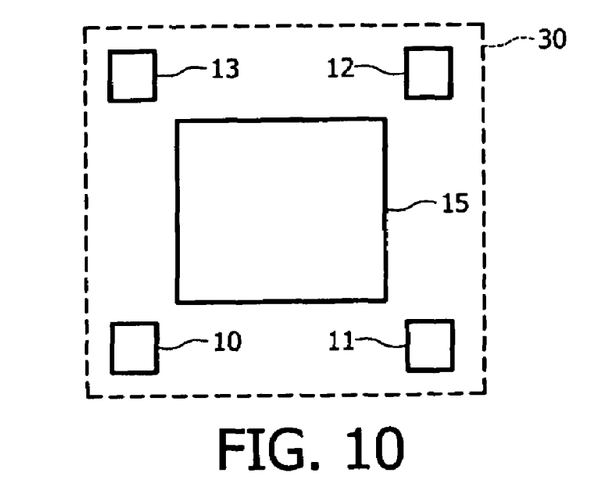

Many other layouts of the electrodes 10,11,12,13,15 of the pixel 2 are possible, see e.g. the layouts shown in FIGS. 9 and 10.

Figure 11:
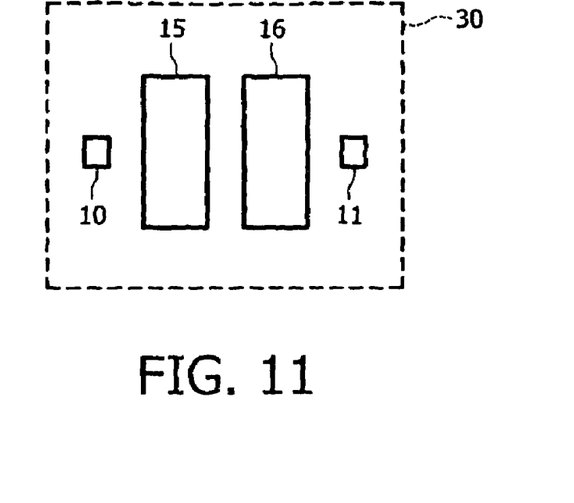

As another example, consider the first particles 6 to be negatively charged and having a red color, and the second particles 7 to be positively charged and having a green color. The common region 30 has four substantially separate regions 20,21,25,26. The transition control means has electrodes 10,11,15,16 for receiving potentials. Each one of the electrodes 10,11,15,16 is associated with a respective substantially separate region 20,21,25,26. In this case, each one of the electrodes 10,11,15,16 has a flat surface 110,111, 115, 116 facing the second substrate 9. The layout of the pixel 2 is shown in FIG. 11. The substantially separate regions 10 and 11 provide a first reservoir for the red particles 6 and a second reservoir for the green particles 7, respectively, and are substantially non-contributing to the optical state of the pixel 2. The substantially separate regions 25 and 26 substantially determine the optical state of the pixel 2; in this example, each region 25 and 26 contributes 50% to the optical state of the pixel 2. Electrodes 15 and 16 are blue. As an example, for displaying the picture, the red particles 6 are in substantially separate region 20 near the surface 110 of electrode 10 and the green particles 7 are in substantially separate region 21 near the surface 111 of electrode 11, whereas substantially no particles 6,7 are in substantially separate regions 25 and 26 near the surfaces 116,116 of electrodes 15 and 16. The electrodes 10,11,15,16 have respective potentials 10 Volts, −10 Volts, 0 Volts and 0 Volts. Then the optical state of the pixel 2 for displaying the picture is B. To obtain an optical state of the pixel 2 for displaying the subsequent picture being R, the electrodes 10,11,15,16 receive respective potentials 0 Volts, −10 Volts, 10 and 10 Volts from the drive means 100. As a consequence of these potentials, the red particles 6 are brought from their position near the surface 110 of electrode 10 to a position near the surfaces 115,116 of electrodes 15 and 16 in substantially separate regions 25 and 26 and the green particles 7 remain present near the surface 111 of electrode 11 in substantially separate region 21. Then the optical state of the pixel 2 for displaying the subsequent picture is R.

Note that to obtain an optical state of the pixel 2 for displaying the subsequent picture being ½ R ½ B, the electrodes 10,11,15,16 receive respective potentials 0 Volts, −10 Volts, 10 and 0 Volts. As a consequence of these potentials, the red particles 6 are brought from their position near the surface 110 of electrode 10 to a position near the surface 115 of electrode 15 in substantially separate region 25 and the green particles 7 remain present near the surface 111 of electrode 11 in substantially separate region 21.

Furthermore, note that an optical state of the pixel 2 for displaying the subsequent picture being ½ R ½ G is also achievable. To obtain this optical state the electrodes 10,11, 15,16 receive respective potentials 0 Volts, 0 Volts, 10 and −10 Volts. As a consequence of these potentials, the red particles 6 are brought from their position near the surface 110 of electrode 10 to a position near the surface 115 of electrode 15 in substantially separate region 25 and the green particles 7 are brought from their position near the surface 111 of electrode 11 to a position near the surface 116 of electrode 16 in substantially separate region 26.

If the optical state of the pixel 2 for displaying the picture is R and the optical state of the pixel 2 for displaying the subsequent picture is ½ R ½ G, at least two different transitions are possible.

The first transition is as follows. For displaying the picture, the electrodes 10,11,15,16 have respective potentials 0 Volts, −10 Volts, 10 and 10 Volts. For achieving the first sub-transition, the electrodes 10,11,15,16 receive respective potentials 10 Volts, −10 Volts, 0 Volts and 0 Volts from the drive means 100. As a result, the red particles 6 are brought from their position near the surfaces 115,116 of electrodes 15 and 16 to a position near the surface 110 of electrode 10 in substantially separate region 20 and the green particles 7 remain present near the surface 111 of electrode 11 in substantially separate region 21. This first sub-transition can be considered as a resetting of the optical state of the pixel 2. Subsequently, for achieving the second sub-transition, the electrodes 10,11,15,16 receive respective potentials 0 Volts, 0 Volts, 10 Volts and −10 Volts from the drive means 100. As a consequence of these potentials, the red particles 6 are brought from their position near the surface 110 of electrode 10 to a position near the surface 115 of electrode 15 in substantially separate region 25 and the green particles 7 are brought from their position near the surface 111 of electrode 11 to a position near the surface 116 of electrode 16 in substantially separate region 26. Then the optical state of the pixel 2 for displaying the subsequent picture is ½ R ½ G.

The second transition is as follows. For displaying the picture, the electrodes 10,11,15,16 have respective potentials 0 Volts, −10 Volts, 10 and 10 Volts. For achieving the first sub-transition, the electrodes 10,11,15,16 receive respective potentials 0 Volts, −10 Volts, 10 Volts and 0 Volts from the drive means 100. As a result, the red particles 6 are brought from their position near the surfaces 115,116 of electrodes 15 and 16 to a position near the surface 115 of electrode 15 in substantially separate region 25 and the green particles 7 remain present near the surface 111 of electrode 11 in substantially separate region 21. Subsequently, for achieving the second sub-transition, the electrodes 10,11,15,16 receive respective potentials 0 Volts, 0 Volts, 10 Volts and −10 Volts from the drive means 100. As a consequence of these potentials, the red particles 6 remain present near the surface 115 of electrode 15 in substantially separate region 25 and the green particles 7 are brought from their position near the surface 111 of electrode 11 to a position near the surface 116 of electrode 16 in substantially separate region 26. Then the optical state of the pixel 2 for displaying the subsequent picture is ½ R ½ G. Note that the pixel 2 has 6 achievable optical states: R, G, B, ½ R ½ G, ½ R ½ B, ½ G ½ B.

Figure 12:
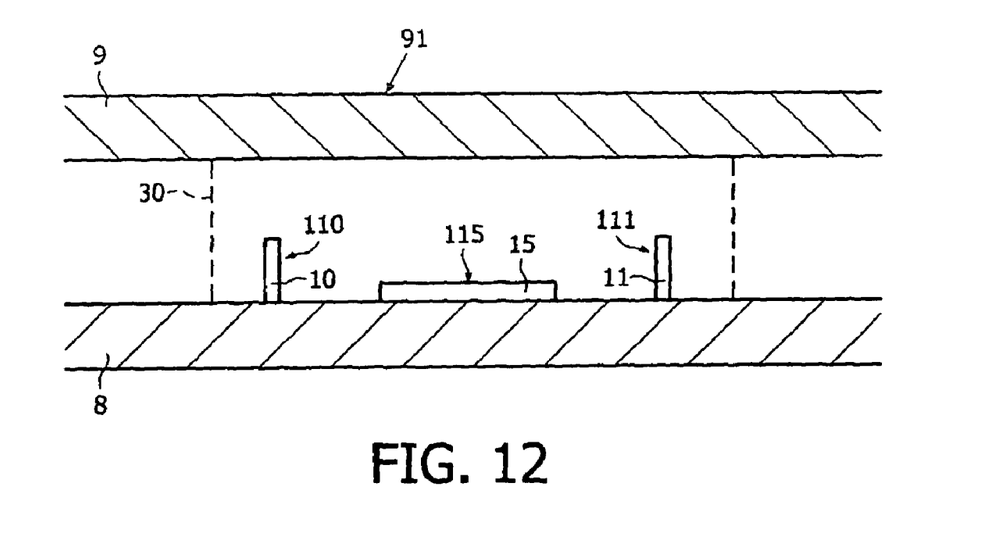
FIG. 12 shows diagrammatically a cross-sectional view along II-II in FIG. 1 of another embodiment of the display panel.

In FIG. 12 the layout of the electrodes 10,11,15 in another embodiment of the pixel 2 is shown. In this example, the pixel 2 has a viewing surface 91 for being viewed by a viewer and the electrodes 10,11,15 have substantially flat surfaces 110, 111, 115 facing the particles 6,7. Surface 110 of electrode 10 being associated with substantially separate region 20 that is substantially non-contributing to the optical state of the pixel 2 is substantially perpendicular to the viewing surface 91. Furthermore, surface 111 of electrode 11 being associated with substantially separate region 21 that is substantially non-contributing to the optical state of the pixel 2 is substantially perpendicular to the viewing surface 91. Furthermore, surface 115 of electrode 15 being associated with substantially separate region 25 that is substantially contributing to the optical state of the pixel 2 is substantially parallel to the viewing surface 91.

In another embodiment, electrode 10 is associated with substantially separate region 20 which provides a first reservoir for the negatively charged first particles 6, electrode 11 is associated with substantially separate region 21 which provides a second reservoir for the negatively charged second particles 7, and the electrophoretic medium has a hysteresis effect. An example of the layout of the pixel 2 is shown in FIG. 4. As an example, for displaying the picture, the red particles 6 are in substantially separate region 20 near the surface 100 of electrode 10, and the green particles 7 are in substantially separate region 21 near the surface 111 of electrode 11, whereas substantially no particles 6,7 are in substantially separate region 25. Furthermore, the electrodes 10,11,15 are blue. The electrodes 10,11,15 have respective potentials of e.g. 10 Volts, 10 Volts and 0 Volts. The optical state of the pixel 2 for displaying the picture is ¼ R ¼ G ½ B. Consider the optical state of the pixel 2 to be obtained for displaying the subsequent picture to be ¼ R ½ G ¼ B. To obtain this optical state, the electrodes 10,11,15 receive respective potentials of e.g. 10 Volts, 0 Volts, and 10 Volts from the drive means 100. As a result, the red particles 6 remain present near the surface 110 of electrode 10 in substantially separate region 20 and the green particles 7 are brought from their position near the surface 111 of electrode 11 to a position near the surface 115 of electrode 15 in substantially separate region 25. Then the optical state of the pixel 2 for displaying the subsequent picture is ¼ R ½ G ¼ B. As a consequence of the electrophoretic medium having a hysteresis effect the substantially separate regions have a reduced overlap compared to the substantially separate regions in case the electrophoretic medium is ideal. Furthermore, because of the electrophoretic medium has a hysteresis effect, the potential of electrode 15 can be somewhat larger than the potential of electrode 10, e.g. the potential of electrodes 10 and 15 being 10 Volts and 11 Volts, respectively, without substantially changing the position of the red particles 6 near the surface 110 of electrode 10.

Figure 13:
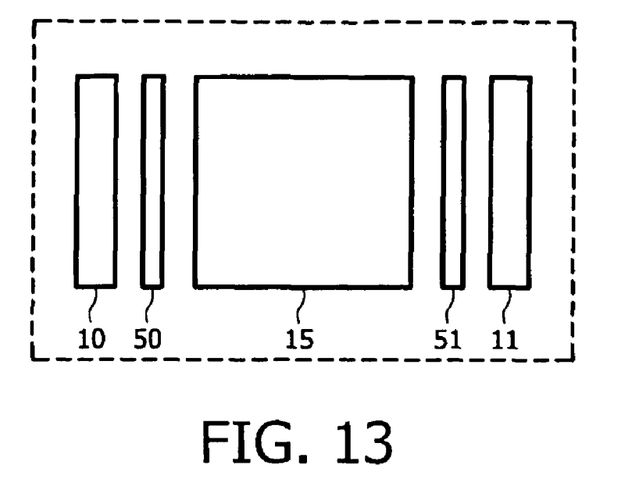
FIG. 13 show diagrammatically a layout of electrodes of a pixel.

In yet another embodiment, electrode 10 is associated with substantially separate region 20 which provides a first reservoir for the negatively charged first pariclcs 6, electrode 11 is associated with substantially separate region 21 which provides a second reservoir for the negatively charged second particles 7. Furthermore, a first and a second gate electrode 50,51 for receiving a first and a second gate potential are present. The first gate electrode 50 is present between electrode 10 and electrodes 11 and 15 whereas the second gate electrode 51 is present between electrode 11 and electrodes 10 and 15. An example of the layout of the pixel 2 is shown in FIG. 13. As an example, for displaying the picture, the red particles 6 are in substantially separate region 20 near the surface 110 of electrode 10, and the green particles 7 are in substantially separate region 21 near the surface 111 of electrode 11, whereas substantially no particles 6,7 are present in substantially separate region 25. Furthermore, the electrodes 10,11,15 are blue. In this example, the substantially separate regions 20,21,25 contribute respectively 25%, 25% and 50% to the optical state of the pixel 2. The electrodes 10,11,15,50, 51 have respective potentials of e.g. 10 Volts, 10 Volts, 0 Volts, −1 Volts and −1 Volts. The optical state of the pixel 2 for displaying the picture is denoted by ¼ R ¼ G ½ B. The electrodes 10,11,15,50,51 have respective potentials of e.g. 10 Volts, 10 Volts, 15 Volts, −1 Volts and −1 Volts. In this example, the first and the second gate potential of −1 Volts prevent the red particles 6 and the green particles 7 from being attracted by electrode 15. Consider the optical state of the pixel 2 to be obtained for displaying the subsequent picture to be ¼ R ½ G ½ B. To obtain this optical state, the electrodes 10,11,15,50,51 receive respective potentials of e.g. 10 Volts, 10 Volts, 15 Volts, −1 Volts and 0 Volts from the drive means 100. In this example, the first gate potential of −1 Volts prevents the red particles 6 from being attracted by electrode 15. Furthermore, the second gate potential of 0 Volts does not prevent the green particles 7 from being attracted by electrode 15. Other values of the second gate potential, e.g. the range 0 to 10 Volts, can also be used. As a result, the red particles 6 remain present near the surface 110 of electrode 10 in substantially separate region 20 and the green particles 7 are brought from their position near the surface 111 of electrode 11 to a position near the surface 115 of electrode 15 in substantially separate region 25. Then the optical state of the pixel 2 for displaying the subsequent picture is ¼ R ½ G ¼ B. As a consequence of the red particles 6 are trapped near the surface 110 of electrode 10 and the green particles 7 are trapped near the surface 115 of electrode 15. Therefore, the substantially separate regions 20,21,25 have reduced or preferably zero overlap compared to the substantially separate regions 20,21,25 in case the gate electrodes were absent.

Figure 14:
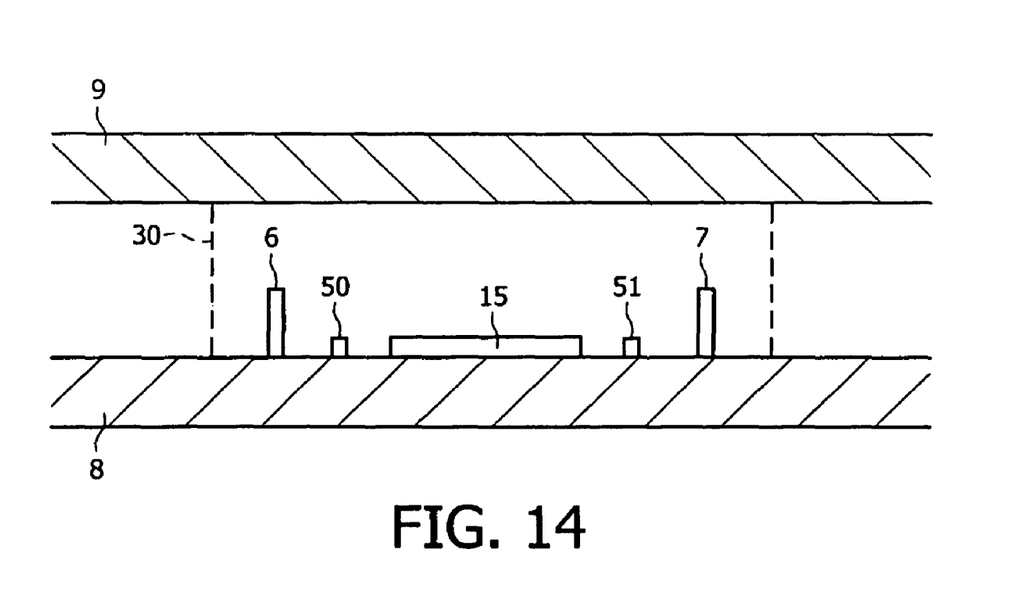
FIG. 14 shows diagrammatically a cross-sectional view along II-II in FIG. 1 of another embodiment of the display panel.

Many other layouts of the electrodes 10,11,15,50,51 of the pixel 2 are possible, see e.g. the layout shown in FIG. 14.

In the pixel 2 the particles are in substantially separate regions. This can relatively easy be achieved during manufacture in the following way. Consider that the electrode structure has already been manufactured and the different particles have to be filled in the substantially separate regions. As an example, the geometry of the electrodes of the pixel 2 as shown in FIG. 8 is used. Consider the red, green, blue and white particles 6,7,40,41 to be positively charged. The order in which the particles 6,7,40,41 are being filled is arbitrary.

In this example, firstly, the red particles 6 are being filled. To achieve this, the electrodes 10,11,12,13,15 receive respective potentials 10 Volts, 0 Volts, 0 Volts, 0 Volts and 0 Volts from the drive means 100 and the container from which the red particles 6 are being filled has a potential of e.g. −5 Volts. The exit of the container is arranged near the pixel 2 to achieve that, as a consequence of the potentials, the red particles 6 exit from the container and occupy a position near the surface 110 of electrode 10 in substantially separate region 20.

Secondly, the green particles 7 are being filled. To achieve this, the electrodes 10,11,12,13,15 receive respective potentials 0 Volts, 10 Volts, 0 Volts, 0 Volts and 0 Volts from the drive means 100 and the container from which the green particles 7 are being filled has a potential of −5 Volts. The exit of the container is arranged near the pixel 2 to achieve that, as a consequence of the potentials the green particles 7 exit from the container and occupy a position near the surface 111 of electrode 11 in substantially separate region 21. Furthermore, as a consequence of the potentials, the red particles 6 that already have been filled remain at their position.

Thirdly, the blue particles 40 are being filled. To achieve this, the electrodes 10,11,12,13,15 receive respective potentials 0 Volts, 0 Volts, 10 Volts, 0 Volts and 0 Volts from the drive means 100 and the container from which the blue particles 40 are being filled has a potential of −5 Volts. The exit of the container is arranged near the pixel 2 to achieve that, as a consequence of the potentials, the blue particles 40 exit from the container and occupy a position near the surface 112 of electrode 12 in substantially separate region 22. Furthermore, as a consequence of the potentials, the red and green particles 6,7 that already have been filled remain at their respective positions.

Fourthly, the white particles 41 are being filled. To achieve this, the electrodes 10,11,12,13,15 receive respective potentials 0 Volts, 0 Volts, 0 Volts, 10 Volts and 0 Volts from the drive means 100 and the container from which the white particles 41 are being filled has a potential of −5 Volts. The exit of the container is arranged near the pixel 2 to achieve that, as a consequence of the potentials, the white particles 41 exit from the container and occupy a position near the surface 113 of electrode 13 in substantially separate region 23.

Furthermore, as a consequence of the potentials, the red, green and blue particles 6,7,40 that already have been filled remain at their respective positions. As a result the pixel 2 has four different particles 6,7,40,41 in substantially separate regions 20,21,22,23, whereas substantially no particles 6,7, 40,41 are present in substantially separate region 24.

The invention claimed is:

1. An electrophoretic display panel for displaying a picture and subsequently displaying a subsequent picture comprising:
   a pixel having
     an electrophoretic medium comprising first and second charged particles, the first charged particles having a first optical property, the second charged particles having a second optical property different from the first optical property, the first and the second charged particles being able to occupy positions in a common region of the pixel, the common region comprising at least three substantially separate sub-regions;
   an optical state depending on the positions of the particles in the common region, and
   transition control means comprising:
   electrodes for receiving potentials, each one of the electrodes being associated with one of the sub-regions, and
   drive means being arranged to control the potentials to control the transition of at least a first number of the first particles and at least a second number of the second particles being in respective separate sub-regions of the common region for displaying the picture, to separate sub-regions of the common region for displaying the subsequent picture,
   wherein the transition control means are further arranged to control the first number of the first particles and the second number of the second particles to always be in separate sub-regions of the common region during the transition.

2. A display panel as claimed in claim 1 characterized in that
   a first one of the sub-regions provides a first reservoir for the first particles substantially non-contributing to the optical state of the pixel, and
   a second one of the sub-regions provides a second reservoir for the second particles substantially non-contributing to the optical state of the pixel,
   a third one of the sub-regions substantially contributes to the optical state of the pixel, and
   the transition comprises:
     a first sub-transition wherein the particles in the third sub-region for displaying the picture are brought to one of the first and second sub-regions and subsequently
     a second sub-transition wherein the particles of the other of the first and second sub-region are brought to the third sub-region for displaying the subsequent picture.

3. A display panel as claimed in claim 1 characterized in that
   a first one of the sub-regions provides a first reservoir for the first particles substantially non-contributing to the optical state of the pixel, and a second one of the sub-regions provides a second reservoir for the second particles substantially non-contributing to the optical state of the pixel,
a third one and a fourth one of the sub-regions each substantially contribute to the optical state of the pixel, and the transition comprises:
   a first sub-transition wherein the particles in the third and the fourth sub-regions for displaying the picture are brought to their respective reservoirs, and subsequently
   a second sub-transition wherein the particles are brought from their respective reservoirs to the third one and the fourth sub-regions for displaying the subsequent picture.

4. A display panel as claimed in claim 1 characterized in that
a first one of the sub-regions provides a first reservoir for the first particles substantially non-contributing to the optical state of the pixel, and
a second one of the sub-regions provides a second reservoir for the second particles substantially non-contributing to the optical state of the pixel,
a third one and a fourth one of the sub-regions each substantially contribute to the optical state of the pixel, and the transition comprises:
   a first sub-transition wherein the particles in the third and the fourth sub-regions for displaying the picture that will be absent in the third one and the fourth one of the substantially separate regions for displaying the subsequent picture are brought to their respective reservoirs, and subsequently
   a second sub-transition wherein the particles which are absent in the third and fourth sub-regions for displaying the picture that have to be present in the third and fourth sub-regions for displaying the subsequent picture are brought from their respective reservoirs to the third and/or the fourth sub-regions for displaying the subsequent picture.

5. A display panel as claimed in claim 1 characterized in that
the pixel has a viewing surface for being viewed by a viewer,
the electrodes have substantially flat surfaces facing the particles, and
the surfaces are substantially parallel to the viewing surface.

6. A display panel as claimed in claim 5 characterized in that the surfaces of the electrodes are present in a substantially flat plane.

7. A display panel as claimed in claim 1 characterized in that
the pixel has a viewing surface for being viewed by a viewer,
the electrodes have substantially flat surfaces facing the particles,
the surfaces of the electrodes being associated with sub-regions that are substantially contributing to the optical state of the pixel are substantially parallel to the viewing surface, and
the surfaces of the electrodes being associated with sub-regions that are substantially non-contributing to the optical state of the pixel are substantially perpendicular to the viewing surface.

8. A display panel as claimed in claim 1 characterized in that
a first one of the sub-regions provides a first reservoir for the first particles,
a second one of the sub-regions provides a second reservoir for the second particles, and
the display panel further comprises first decoupling means to reduce the influence of the potential of the electrode associated with the first reservoir on the position of the second particles.

9. A display panel as claimed in claim 8 characterized in that the display panel further comprises second decoupling means to reduce the influence of the potential of the electrode associated with the second reservoir on the position of the first particles.

10. A display panel as claimed in claim 9 characterized in that the first and the second decoupling means are realized by the electrophoretic medium comprising a hysteresis effect.

11. A display panel as claimed in claim 9 characterized in that the first and the second decoupling means comprise a first and a second gate electrode for receiving a first and a second gate potential, the first and the second gate electrode being present between the electrodes associated with the first and the second reservoir.

12. A display panel as claimed in claim 11 characterized in that the first gate electrode is present between the electrode associated with the first reservoir and the electrode associated with a third one of the sub-regions and the second gate electrode is present between the electrode associated with the second reservoir and the electrode associated with the third sub-region.

13. A display panel as claimed in claim 12 characterized in that, in operation, the potentials of the electrodes associated with the first and the second reservoir and the potential of the electrode associated with the third sub-region are substantially constant in time.

14. A display panel as claimed in claim 9 characterized in that the first and the second decoupling means comprise a first particles repulsive layer present between the electrode associated with the first reservoir and the electrode associated with a third sub-region, and a second particles repulsive layer present between the electrode associated with the second reservoir and the electrode associated with the third sub-region.

15. A display panel as claimed in claim 9 characterized in that the first and the second decoupling means comprise a first membrane through which a passage of the first particles is determined by a first threshold, the first membrane being present between the electrode associated with the first reservoir and the electrode associated with a third sub-region, and a second membrane through which a passage of the second particles is determined by a second threshold, the second membrane being present between the electrode associated with the second reservoir and the electrode associated with the third sub-region.

16. A display device comprising the display panel as claimed in claim 1 and a circuitry to provide image information to the display panel.

17. The electrophoretic display panel as claimed in claim 1 characterized in that said first charges particles have the same electric polarity as the second charge particles.

18. Method of driving an electrophoretic display panel for displaying a picture and subsequently displaying a subsequent picture, the electrophoretic display panel comprising:
a pixel having
   an electrophoretic medium comprising first and second charged particles, the first charged particles having a first optical property, the second charged particles having a second optical property different from the first optical property, the first and the second charged particles being able to occupy positions in a common region of the pixel, the common region comprising at least three substantially separate sub-regions, and an optical state depending on the positions of the particles in the common region;

the method comprising controlling a transition of at least a first number of the first particles and at least a second number of the second particles in respective sub-regions in the common region for displaying the picture to separate sub-regions in the common region for displaying the subsequent picture, wherein the first number of the first particles and the second number of the second particles are controlled to always be in separate sub-regions during the transition, and wherein the transition comprises a sub-transition.

19. The method as claimed in claim 18 characterized in that said first charges particles have the same electric polarity as the second charge particles.

* * * * *